United States Patent
Kettemann et al.

(10) Patent No.: US 11,754,192 B2
(45) Date of Patent: Sep. 12, 2023

(54) DIAPHRAGM VALVE AND METHOD OF MANUFACTURING THE SAME

(71) Applicant: Buerkert Werke GmbH & Co. KG, Ingelfingen (DE)

(72) Inventors: Ralf Kettemann, Ingelfingen (DE); Karl Geist, Ingelfingen (DE)

(73) Assignee: BUERKERT WERKE GMBH & CO. KG

( * ) Notice: Subject to any disclaimer, the term of this patent is extended or adjusted under 35 U.S.C. 154(b) by 0 days.

(21) Appl. No.: 17/741,857

(22) Filed: May 11, 2022

(65) Prior Publication Data
US 2022/0364651 A1 Nov. 17, 2022

(30) Foreign Application Priority Data
May 12, 2021 (DE) ...................... 10 2021 112 525.1

(51) Int. Cl.
*F16K 7/16* (2006.01)
*F16K 27/02* (2006.01)
*F16K 11/02* (2006.01)

(52) U.S. Cl.
CPC ............ *F16K 7/16* (2013.01); *F16K 27/0236* (2013.01); *F16K 11/022* (2013.01)

(58) Field of Classification Search
CPC ....... F16K 7/16; F16K 27/0236; F16K 11/022
See application file for complete search history.

(56) References Cited

U.S. PATENT DOCUMENTS

| | | | |
|---|---|---|---|
| 3,259,274 A | 7/1966 | Klasson et al. | |
| 3,591,961 A * | 7/1971 | Woodward | F01N 3/22 137/115.06 |
| 3,704,807 A * | 12/1972 | Lidgard | F16K 17/162 220/89.2 |
| 3,722,523 A * | 3/1973 | Kawabata | F23N 1/087 137/484.2 |
| 4,412,704 A * | 11/1983 | Gagnebin | F16D 3/065 400/354.1 |
| 7,527,241 B2 * | 5/2009 | Lodolo | F16K 7/126 137/859 |
| 9,470,322 B2 | 10/2016 | Wolpert et al. | |
| 2014/0158923 A1 | 6/2014 | Wolpert et al. | |
| 2014/0166918 A1 | 6/2014 | Kropf et al. | |
| 2018/0128267 A1 * | 5/2018 | Kawamura | A61B 5/022 |

FOREIGN PATENT DOCUMENTS

| | | | | |
|---|---|---|---|---|
| CN | 106885010 A | * | 6/2017 | |
| CN | 110017386 A | * | 7/2019 | |
| CN | 110168265 A | * | 8/2019 | ......... F16K 27/0236 |
| DE | 1935926 A1 | | 2/1971 | |
| DE | 102015212997 A1 | * | 1/2017 | |
| EP | 2048419 A1 | * | 4/2009 | |
| EP | 2652371 B1 | | 10/2013 | |
| GB | 2246616 A | * | 2/1992 | |
| KR | 100778894 B1 | * | 11/2007 | |
| WO | WO-2021218050 A1 | * | 11/2021 | |

* cited by examiner

Primary Examiner — Hailey K. Do
(74) Attorney, Agent, or Firm — Dilworth IP, LLC

(57) ABSTRACT

A diaphragm valve, in particular for fluid media, has a valve body, a diaphragm and a valve drive, by the actuation of which the diaphragm can be acted upon. The valve body and the diaphragm are permanently connected to form a unit in that the diaphragm is clamped in a circumferential edge portion between the valve body and a counter piece and is riveted thereto. Further proposed is a method of manufacturing such a valve.

18 Claims, 3 Drawing Sheets

DIAPHRAGM VALVE AND METHOD OF MANUFACTURING THE SAME

FIELD OF THE INVENTION

The invention relates to a diaphragm valve, in particular for fluid media, having a valve body, a diaphragm and a valve drive, by the actuation of which the diaphragm can be acted upon, wherein the valve body and the diaphragm are permanently connected to form a unit. The invention further relates to a method of manufacturing such a diaphragm valve.

BACKGROUND

For media control in single-use systems or pre-sterilizable filtration systems for single use, in particular so-called tangential flow filtration systems (also referred to as cross-flow filtration) for chemical or pharmaceutical applications, diaphragm valves are needed in which the components in contact with the media, namely the valve body and the diaphragm, are, for one thing, easily replaceable and, for another, connected with each other in a hermetically sealed manner throughout their entire life cycle, usually consisting of assembly, sterilization, production and disposal. No germs or particles may enter the unit made up of the valve body and the diaphragm from the outside, nor may media escape from this unit into the environment.

EP 2 652 371 B1 discloses a diaphragm valve in which the valve body and the diaphragm are connected by ultrasonic welding to form a unit and, additionally, the diaphragm is mechanically sealed by clamping or crimping between the valve drive or an intermediate piece, on the one hand, and the valve body, on the other hand. Since the valve body and the diaphragm constitute an inseparable unit, the latter may be used as a disposable or single-use valve body unit and may be coupled to a reusable valve drive.

A drawback of this known solution is that, due to the welded connection, the options with regard to the choice of materials for the valve body and the diaphragm are limited.

The invention provides a diaphragm valve having a valve body unit for one-time use, which distinguishes itself by reliable sealing combined with simple manufacture.

SUMMARY

A diaphragm valve, in particular for fluid media, has a valve body, a diaphragm and a valve drive, by the actuation of which the diaphragm can be acted upon, wherein the valve body and the diaphragm are permanently connected to form a unit. The valve body and the diaphragm are permanently connected to form a unit in that the diaphragm is clamped in a circumferential edge portion between the valve body and a counter piece and is riveted thereto. This results in a force-locking and form-fitting connection of the diaphragm with the valve body. The riveting and the clamping of the diaphragm effected thereby result in a permanent pressure on the diaphragm, as a result of which the unit made up of the valve body and the diaphragm is hermetically sealed. In addition, because of the riveted connection, the choice of suitable materials for the valve body and the diaphragm is less limited in the configuration according to the invention than is the case with a welded connection between these components.

In an embodiment, one of the valve body and the counter piece has a plurality of rivet shanks provided thereon, which extend through associated recesses in the diaphragm and in the other one of the valve body and the counter piece and the free ends of which are plastically reshaped. In order to obtain a uniform application of pressure to the diaphragm and thus a particularly good sealing effect, the rivet shanks here are arranged in particular in a regular pattern.

A simple assembly of the valve body/diaphragm unit is obtained if the rivet shanks are integrally molded with the valve body or the counter piece.

Alternatively, the rivet shanks may also be formed separately, in which case the valve body, the diaphragm and the counter piece have recesses in alignment with each other, through which the rivet shanks extend.

The free ends of the rivet shanks can be reshaped by means of ultrasound. In this so-called ultrasonic riveting, the plastic material is plasticized at the point of contact by means of a targeted conversion of sound energy into heat using a sonotrode and is deformed under pressure and pressed down. Cooling is also effected at least largely by the sonotrode. Alternatively, orbital riveting or radial riveting or hot forming is also possible.

In a further development of the invention, the circumferential edge portion of the diaphragm has a smaller axial thickness than a central portion of the diaphragm, in particular wherein the circumferential edge portion is integrally molded with the central portion. Here, the difference in axial thickness is preferably greater than the axial thickness of the counter piece in the area of contact with the diaphragm.

In a configuration, the counter piece is a ring. In particular, the diaphragm is essentially formed as a circular disc in the radial plane, as a result of which a particularly high level of tightness is achieved, and the ring serving as the counter piece is a circular ring.

On its radial outer edge the counter piece can have an axially angled edge by which it laterally covers the diaphragm and at least partly covers a flange section of the valve body. The edge serves, among other things, to stabilize the counter piece.

In an embodiment, the valve body and the diaphragm are made of different materials, in particular different plastics. In this context, the materials for the two components can be selected completely independently of each other, which is usually not possible for a valve with a valve body/diaphragm unit welded together.

The diaphragm may be produced from an ethylene propylene diene monomer rubber (EPDM). EPDMs are not only distinguished by high aging resistance and are robust and thermally resistant, but also have good chemical resistance to polar media such as, e.g., water or alcohol. In addition, EPDMs have only a minor impact on the environment during manufacture, processing and use. In particular, a thermoplastic material is used for the valve body.

In a further development of the invention, two mutually independent sealing areas are provided on the diaphragm. They can advantageously complement each other in their sealing effect while avoiding any adverse mutual influence due to the mutually independent configuration.

A first sealing area can be formed by the clamping of the diaphragm between the valve body and the counter piece and an elastic deformation of the diaphragm effected thereby. In this way, a hermetic seal of the unit made up of the valve body and the diaphragm is achieved, in particular against external influences, which is also effective in the non-installed state, for example during a transport phase. This prevents contamination of the valve chamber or the environment. Preferably, here the edge portion of the diaphragm in which the first sealing area is arranged is designed to be less thick than a central portion of the diaphragm.

To further improve the tightness, circumferential sealing grooves may be provided on the valve body in the region of the first sealing area.

In a configuration, a second sealing area is formed in that the diaphragm is statically pressed between a housing of the valve drive and the valve body. This results in an additional seal against the internal pressure within the valve body generated by the fluid medium during operation.

In the region of the second sealing area, the housing of the valve drive may have an integrally molded sealing bead, which rests against the diaphragm. In this way, the force required for pressing the diaphragm in the second sealing area is generated in a simple manner in terms of production engineering.

A design in which the second sealing area is formed in a radially outer circumferential section of a central portion of the diaphragm which radially inwardly adjoins the circumferential edge portion of the diaphragm and has a greater axial thickness than the edge portion has proved to be particularly favorable in terms of the tightness achieved.

The two sealing areas can have the shape of concentric circles, with the first sealing area being arranged radially outwardly and the second sealing area being arranged radially inwardly.

Here an outer circumference of the central portion of the diaphragm is spaced apart from an inner circumference of the counter piece, as viewed in the radial direction. In this way, a geometric decoupling of the two sealing areas is obtained. The diaphragm material displaced outward in the second sealing area by the diaphragm being pressed between the valve drive and the valve body can be received in a gap between the outer circumference of the central portion of the diaphragm and the inner circumference of the counter piece without adversely affecting the first sealing area.

The invention further relates to a method of manufacturing such a diaphragm valve.

DETAILED DESCRIPTION

Figure 1:
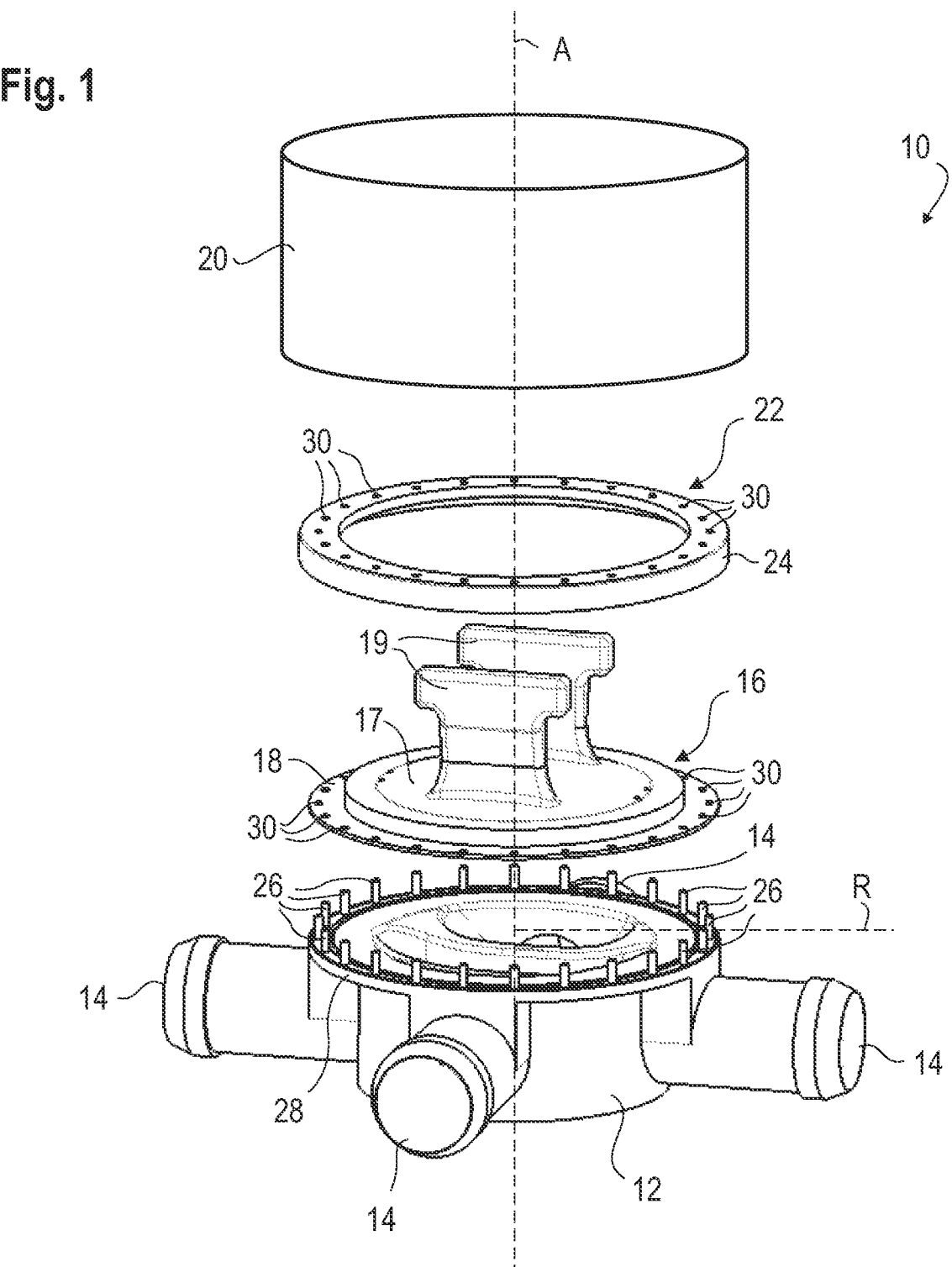
FIG. 1 shows a perspective view of a diaphragm valve according to a first embodiment of the invention prior to assembly, which is manufactured in accordance with the method according to the invention.

FIG. 1 shows a diaphragm valve 10 for fluid media according to a first embodiment of the invention in the non-assembled state. The diaphragm valve 10 includes a valve body 12, which, in the embodiment shown, has four fluidic inlets or outlets 14. Two valve seats, not shown in the Figure, are arranged between the inlets and outlets 14.

Opposite to the two valve seats, a shared diaphragm 16 is provided, which includes a central portion 17 and a circumferential edge portion 18 adjoining it on the outside in the radial direction R. The circumferential edge portion 18 is integrally molded with the central portion 17 and has a smaller axial thickness (i.e. a smaller thickness in the axial direction A) than the latter.

Provided in the central portion 17 of the diaphragm 16 are two fastening elements 19 which are formed integrally with the diaphragm 16 and serve for the force-locking and form-fitting connection with two thrust pieces of a valve drive 20, which is only schematically indicated in FIG. 1.

The valve drive 20 is configured to move one or the other thrust piece simultaneously or independently of each other in the axial direction A when it is actuated and, in this way, to act on the diaphragm 16 so that the first or the second valve seat is closed and the flow of the fluid medium is thereby prevented.

Figure 2:
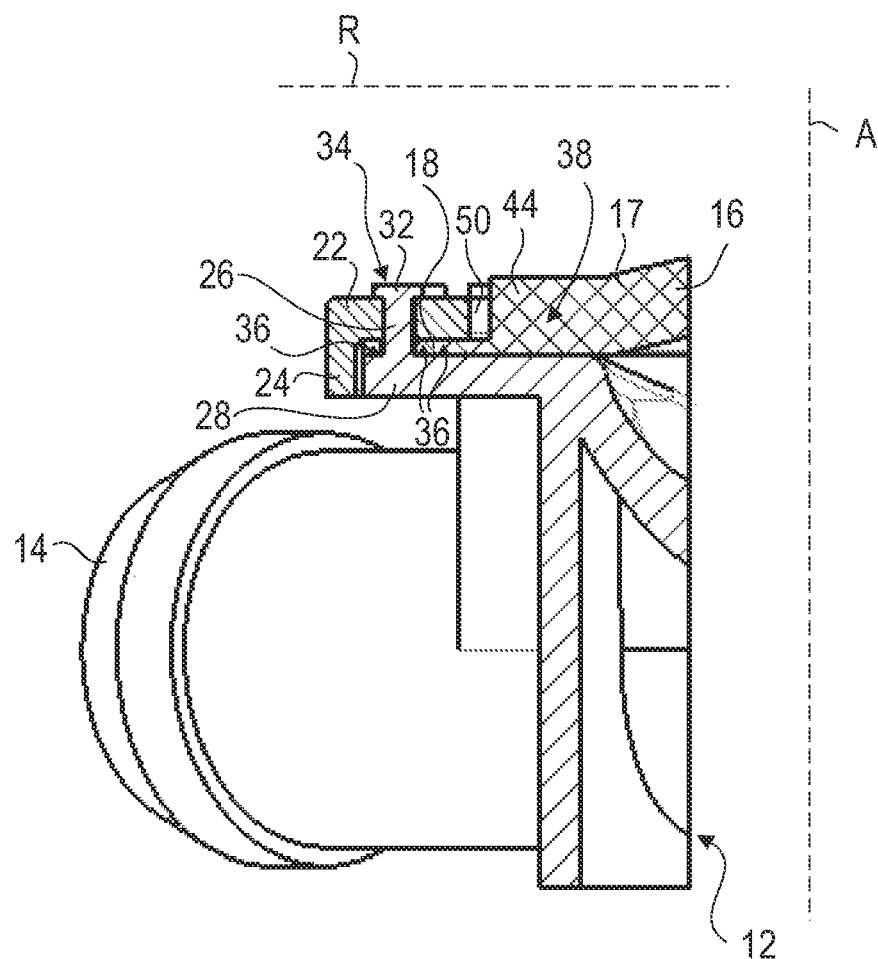
FIG. 2 shows a sectional detail view of a pre-assembled unit made up of the valve body and the diaphragm of the diaphragm valve of FIG. 1.

Furthermore, a counter piece 22 in the form of a ring, in this case a circular ring, is provided, which serves to connect the valve body 12 with the diaphragm 16 and has an axially angled edge 24 on its radial outer edge (see FIG. 2).

In order to permanently connect the diaphragm 16 to the valve body 12 in a force-locking and form-fitting manner to form a unit, the valve body 12 has a plurality of rivet shanks 26 provided thereon, which are integrally molded in a circumferential flange section 28, located on the outside in the radial direction R, of the valve body 12.

The circumferential edge portion 18 of the diaphragm 16 and the counter piece 22 have a corresponding number of recesses 30, each recess 30 in one of the two components being associated with a respective rivet shank 26 and being intended to receive it.

Both the rivet shanks 26 and the recesses 30 form a circular ring-shaped pattern with constant spacings between the individual rivet shanks 26 and the individual recesses 30.

When the subassembly made up of the diaphragm 16 and the valve body is assembled, the rivet shanks 26 are passed through the associated recesses 30 in the diaphragm 16 and in the counter piece 22, or the diaphragm 16 and the counter piece 22 are fitted onto the rivet shanks 26 by the recesses 30. The free ends of the rivet shanks 26 here protrude beyond the counter piece 22 and are plastically reshaped by means of ultrasound. To this end, the plastic material is plasticized from above at the point of contact using a sonotrode and is deformed and pressed down under pressure.

In this way, the free ends of the rivet shanks 26 are upset to form a riveted plate 32. The riveted plate 32 produces a permanent pressure on the circumferential edge portion 18 of the diaphragm 16 here, whereby the latter is clamped between the valve body 12 and the counter piece 22 and is thus connected to the valve body 12 by means of the rivet shanks 26 and the counter piece 22 in a force-locking and form-fitting manner.

FIG. 2 shows the exchangeable subassembly consisting of the valve body 12, the diaphragm 16 and the counter piece 22 in the assembled state. Here, the subassembly serves as a single-use unit that is coupled to the reusable valve drive 20.

The valve body 12 and the integrally molded rivet shanks 26 are made from a thermoplastic material; the diaphragm 16 is here made from an elastomer such as EPDM, the use of which is made possible by the riveting. In contrast, if the diaphragm and the valve body were welded to each other, as is known from the prior art, a thermoplastic diaphragm would have to be used, since an elastomer and a thermoplastic cannot be welded directly to each other.

As is further apparent from FIG. 2, in the assembled state the axially angled edge 24 of the counter piece 22 laterally covers the diaphragm 16 and at least partly covers the flange section 28 of the valve body 12.

Due to the clamping of the diaphragm 16 between the valve body 12 and the counter piece 22 and the permanent tensioning or elastic deformation of the diaphragm 16 effected thereby, a first sealing area 34 is formed at the diaphragm, which provides for a constant sealing of the unit made up of the valve body 12 and the diaphragm 16 even in the non-installed state or in the state coupled to a valve drive 20.

In addition, a plurality of circumferential sealing grooves 36 are provided on the valve body 12 in the region of the first sealing area 34, which serve to improve the hermetic seal.

As an alternative to the configuration shown, the rivet shanks 26 may also be provided on the counter piece 22. Furthermore, it is also conceivable to form the rivet shanks 26 as separate components, in which case the valve body 12 also has recesses, which are aligned with the recesses 30 in the circumferential edge portion 18 of the diaphragm 16 and the recesses 30 in the counter piece 22. Of course, the diaphragm valve 10 may also be formed with only one valve seat and one inlet and outlet each.

Figure 3:
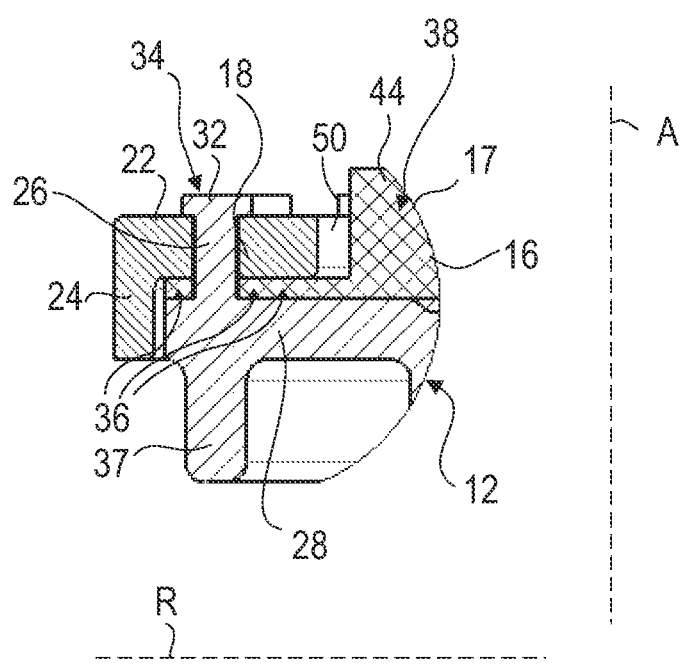
FIG. 3 shows a sectional detail view of a pre-assembled unit made up of the valve body and the diaphragm of a diaphragm valve according to a second embodiment of the invention.

FIG. 3 shows an assembled subassembly made up of the valve body 12, the diaphragm 16 and the counter piece 22 for a diaphragm valve 10 according to a second embodiment of the invention; in the following, the same components bear the same reference numbers and the only difference from the previously described configuration consists in that in the embodiment according to FIG. 3, the valve body 12 includes an integrally molded, circularly circumferential stiffening rib 37 in the region of the rivet shanks 26, which extends in the axial direction A in the opposite direction to the rivet shanks 26 and increases the stability in this area.

In order to additionally seal the subassembly made up of the valve body 12, the diaphragm 16 and the counter piece 22 against the internal pressure inside the valve body 12 (media pressure) during operation of the diaphragm valve 10, which the first sealing area 34 alone may possibly not be able to withstand, a second sealing area 38 is provided on the diaphragm 16, which is formed by the diaphragm 16 in the coupled state being statically pressed between a housing 40 of the valve drive 20 and the valve body 12.

Figure 4:
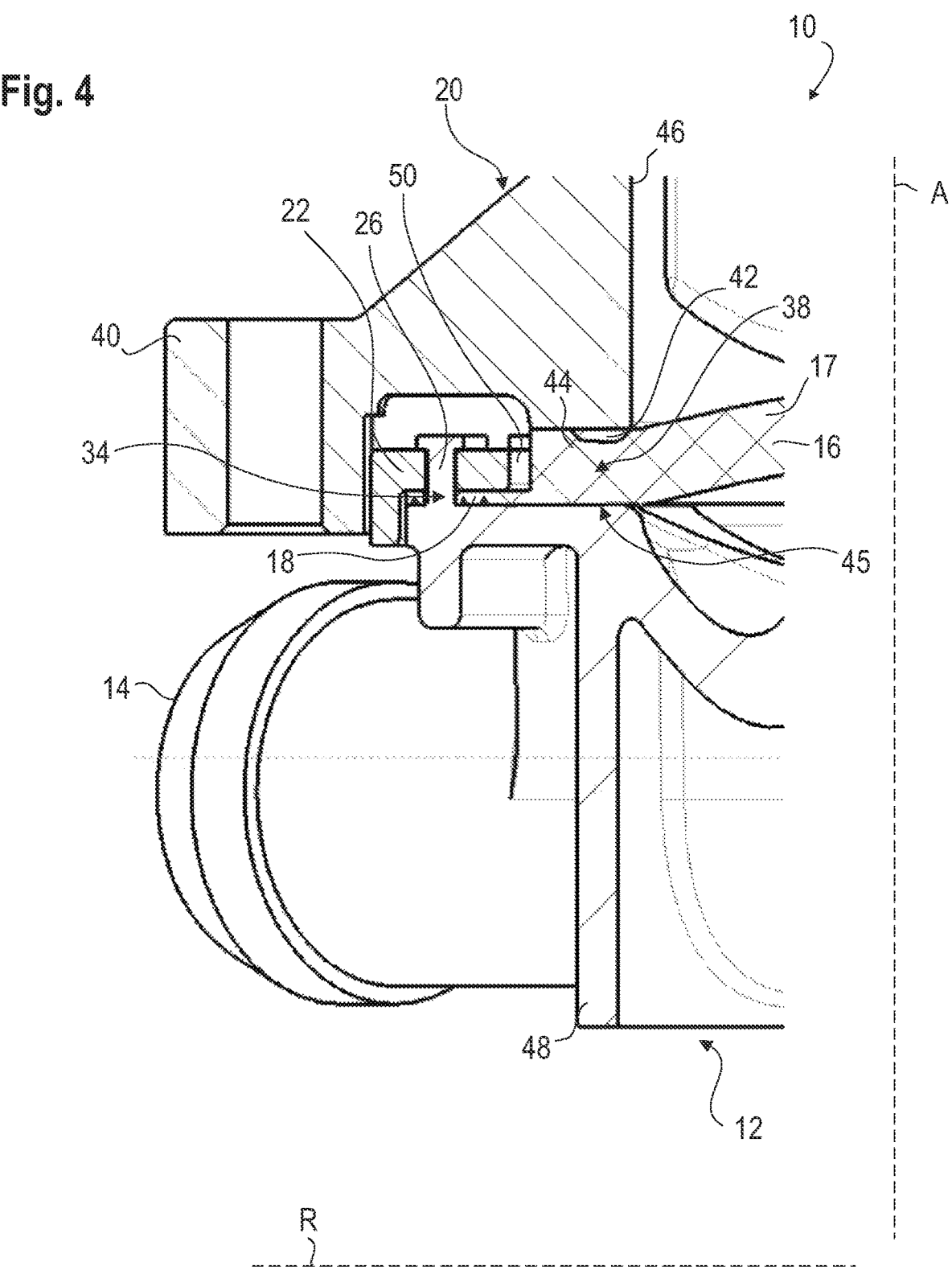
FIG. 4 shows a sectional detail view of the diaphragm valve according to the second embodiment of the invention in the assembled state, this diaphragm valve also being manufactured in accordance with the method according to the invention.

This can be seen in particular from FIG. 4, which shows the diaphragm valve 10 according to the second embodiment of the invention in the fully assembled state, in which the subassembly made up of the valve body 12, the diaphragm 16 and the counter piece 22 is coupled to the valve drive 20.

In the region of the second sealing area 38, the housing 40 of the valve drive 20 includes an integrally molded sealing bead 42 that rests against a horizontal, radially outer circumferential section 44 of the central portion 17 of the diaphragm 16 and acts upon the latter. In this way, the diaphragm 16 is statically pressed between the sealing bead 42 on the valve drive 20 and an opposing plane surface 45 on the valve body 12.

A driving force that is produced when the valve drive 20 is actuated is transferred downward in the axial direction A via a cylindrical housing wall 46 of the housing 40 and into a wall 48 of the valve body 12, thereby producing the counterforce for generating the static seal against the internal pressure.

The first 34 and second 38 sealing areas are formed independently of each other here. While the second sealing area 38 is formed in the radially outer circumferential section 44 of the central portion 17 of the diaphragm 16, the first sealing area 34, as already mentioned, is implemented in the circumferential edge portion 18 of the diaphragm 16 having a smaller axial thickness.

Geometric decoupling of the two sealing areas 34, 38 is additionally obtained in that an outer circumference of the central portion 17 of the diaphragm 16 is spaced apart from the inner circumference of the counter piece 22, as viewed in the radial direction R. The diaphragm material displaced outwards by the diaphragm 16 being pressed between the valve drive 20 and the valve body 12 can be received in the resulting gap 50 without affecting the first sealing area 34.

The invention claimed is:

1. A diaphragm valve, comprising:
    a valve body,
    a valve drive having a housing,
    a diaphragm having a circumferential edge portion, and
    a counter piece which is a ring having a radial outer edge,
        the counter piece and the housing of the valve drive being two different components,
    wherein, by actuation of the valve drive the diaphragm can be acted upon,
    wherein the valve body and the diaphragm are permanently connected to form a unit in that the diaphragm is clamped in the circumferential edge portion between the valve body and the counter piece and is riveted thereto, and
    wherein the valve body, the diaphragm, and the counter piece form an exchangeable subassembly serving as a single-use unit that is coupled to the valve drive, wherein the valve drive is reusable.

2. The diaphragm valve according to claim 1, wherein on its radial outer edge the counter piece has an axially angled edge by which the counter piece laterally covers the diaphragm and at least partly covers a flange section of the valve body.

3. The diaphragm valve according to claim 1, wherein the valve body and the diaphragm are made of different materials.

4. The diaphragm valve according to claim 1, wherein the valve body and the diaphragm are made of different plastics.

5. The diaphragm valve according to claim 1, wherein the circumferential edge portion of the diaphragm has a smaller axial thickness than a central portion of the diaphragm.

6. The diaphragm valve according to claim 5, wherein the circumferential edge portion is integrally molded with the central portion.

7. The diaphragm valve according to claim 1, wherein one of the valve body and the counter piece has a plurality of rivet shanks provided thereon, which extend through associated recesses in the diaphragm and in the other one of the valve body and the counter piece and free ends of which are plastically reshaped.

8. The diaphragm valve according to claim 7, wherein the rivet shanks are integrally molded with one of the valve body and the counter piece.

9. The diaphragm valve according to claim 7, wherein the rivet shanks have free ends which are reshaped by ultrasound.

10. The diaphragm valve according to claim 1, wherein two mutually independent sealing areas are provided on the diaphragm.

11. The diaphragm valve according to claim 10, wherein a first sealing area is formed by the clamping of the diaphragm between the valve body and the counter piece and an elastic deformation of the diaphragm effected thereby.

12. The diaphragm valve according to claim 11, wherein circumferential sealing grooves are provided on the valve body in a region of the first sealing area.

13. The diaphragm valve according to claim 11, wherein a second sealing area is formed in that the diaphragm is statically pressed between a housing of the valve drive and the valve body.

14. The diaphragm valve according to claim 13, wherein in a region of the second sealing area, the housing of the valve drive has an integrally molded sealing bead, which rests against the diaphragm.

15. The diaphragm valve according to claim 13, wherein the second sealing area is formed in a radially outer circumferential section of a central portion of the diaphragm which radially inwardly adjoins, and has a greater axial thickness than, the circumferential edge portion of the diaphragm.

16. The diaphragm valve according to claim 15, wherein an outer circumference of the central portion of the diaphragm is spaced apart from an inner circumference of the counter piece as viewed in a radial direction (R).

17. A method of manufacturing a diaphragm valve the method comprising steps of:
provinding a valve body, a diaphragm having a circumferential edge portion, a valve drive having a housing, wherein by actuation of the valve drive the diaphragm can be acted upon, and a counter piece which is a ring having a radial outer edge, the counter piece and the housing of the valve drive being two different components,
connecting the valve body and the diaphragm to form a permanent unit by clamping the diaphragm in the circumferential edge portion between the valve body and the counter piece and riveting it thereto, whereby the valve body, the diaphragm and the counter piece form an exchangeable subassembly serving as a single-use unit, and
coupling the exchangeable subassembly to the valve drive, wherein the valve drive is reusable.

18. The method according to claim 17, wherein riveting is conducted by ultrasonic forming of rivet shanks.

\* \* \* \* \*